March 3, 1953  O. A. WRIGHT ET AL  2,630,228
FUEL FILTER
Filed Oct. 23, 1948  2 SHEETS—SHEET 1
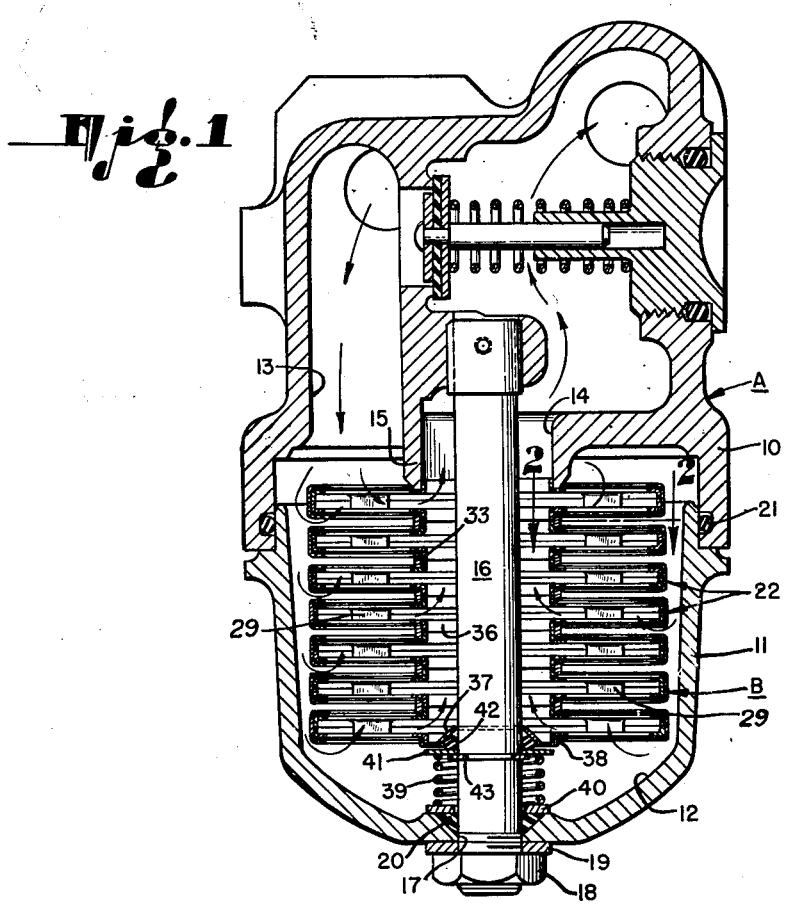
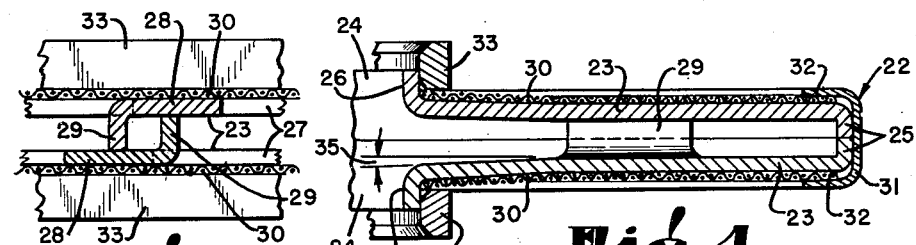
INVENTORS
OTIS A. WRIGHT
EDWARD H. GODDARD
RUSSELL H. COLE
BY
ATTORNEY March 3, 1953 O. A. WRIGHT ET AL 2,630,228
FUEL FILTER
Filed Oct. 23, 1948 2 SHEETS—SHEET 2
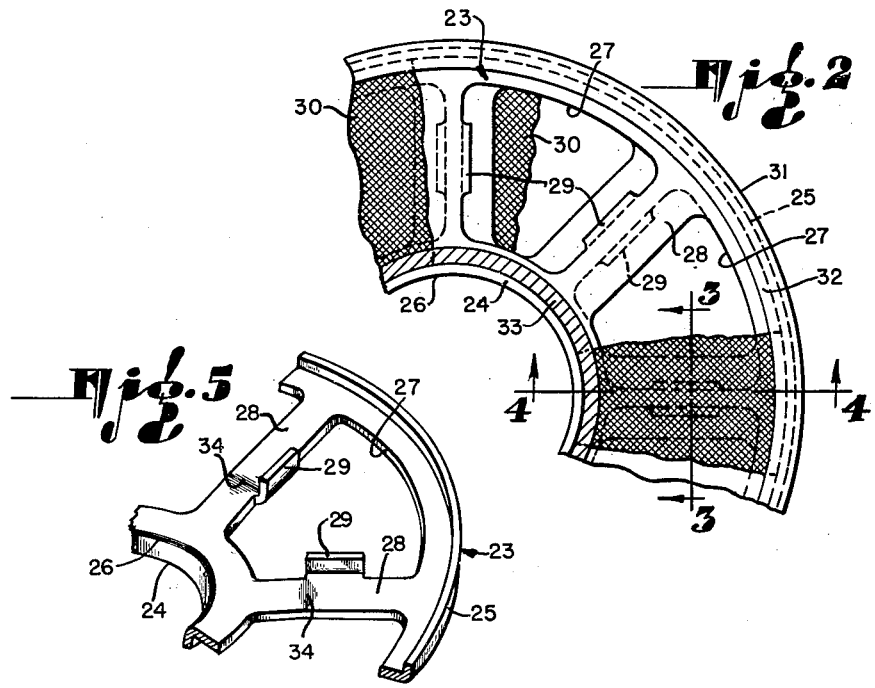
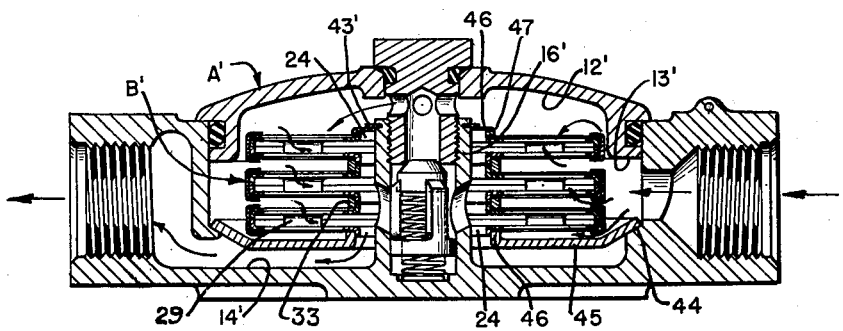
INVENTORS
OTIS A. WRIGHT
EDWARD H. GODDARD
RUSSELL H. COLE
BY
ATTORNEY Patented Mar. 3, 1953

2,630,228

UNITED STATES PATENT OFFICE 2,630,228

FUEL FILTER

Otis A. Wright and Edward H. Goddard, Burbank, and Russell H. Cole, Pasadena, Calif., assignors, by mesne assignments, to Air Valve, Inc., Burbank, Calif., a corporation of California Application October 23, 1948, Serial No. 56,132

8 Claims. (Cl. 210—169)

The present invention relates generally to filtering means, and is more particularly concerned with improvements in the filtering assemblies (often designated "stacks") of filtering devices such as utilized for the filtering of fuels and other fluids.

One object of the herein described invention is to provide a filter stack of novel construction consisting of a plurality of filter sections arranged for assembly in stacked or superposed relation, wherein the assembled sections are interlocked and retained in a position of use by resiliently applied pressure acting in an axial direction of the filter element.

A further object is to provide in connection with a filter element assembly having a plurality of filtering sections in superposed relation defining an axial flow passage adapted to receive an elongate member such as a stem therethrough, novel mounting means at the ends of the filter stack for positioning and supporting the filter stack so that the periphery of its axial flow passage will be spaced from the outer surface of said member or stem to form a flow passage therealong.

Still another object is to provide an improved filter element assembly having a plurality of sectional filtering units of novel construction, which are arranged for assembly in stacked or superposed interlocking relation, each unit being fabricated from a pair of annular, dished, plate-like sections adapted to be assembled in relatively reversed relation; and wherein parts of the sections are so formed as to act as spacing elements between the assembled sections.

It is also an object to provide a filter stack of unique construction fabricated from a plurality of easily assembled standard sections of annular disc-like form, the construction of the respective sections being such that the completed element will be axially compressible and expansible.

Further objects of the invention will be brought out in the following part of the specification, wherein detailed description is for the purpose of fully disclosing the invention without placing limitations on the scope of the invention defined in the appended claims.

Referring to the drawings, which are for illustrative purposes only:

Fig. 1 is a vertical section through a fluid filtering device having a filter element according to the present invention embodied therein;

Fig. 2 is an enlarged sectional view of a section unit of the filter element of the present invention, taken substantially on line 2—2 of Fig. 1, portions being cut away to disclose details of construction;

Fig. 3 is a sectional view through a portion of the section unit, taken substantially on line 3—3 of Fig. 2;

Fig. 4 is a radial section through the section unit, taken substantially on line 4—4 of Fig. 2;

Fig. 5 is a fragmentary isometric view showing the details of construction of the spacer lugs and other details of the plate-like members used in fabrication of the section units; and Fig. 6 is a filtering device illustrating a modified mounting for a filter element embodying the features of the present invention.

Referring generally to Fig. 1 of the drawings, there is disclosed a filter device A of generally hollow construction containing a main body portion 10 having a removable bowl part 11 cooperatively associated therewith to form a filtering chamber 12. The filtering chamber communicates with an inlet fluid passage 13 and an outlet passage 14 through a tubular seat 15 in the main body portion at the upper end of the filtering chamber and centrally located therein.

The bowl 11 is removably secured in operating position by an internal elongate stem 16 anchored at its uppermost end in a part of the main body portion and projecting through the outlet passage 14 so as to depend below the main body portion of the device. The projecting end of the stem 16 is arranged to extend through an opening 17 in the bottom of the bowl 11, and is threaded to receive a securing nut 18 which may be tightened against a washer 19 to retain the bowl 11 in secured position. The stem 16 where it passes through the bottom of the bowl 11 is sealed by a sealing member 20, and the upper end of the bowl is sealed with respect to the main body portion by means of a sealing ring 21 so that the filtering chamber will be completely sealed except for the inlet and outlet passages thereto.

A filter assembly or stack, as generally indicated at B, constructed in accordance with the present invention is mounted within the filter chamber. This filter stack in general, is composed of a plurality of sectional units 22 adapted to be assembled in stacked superposed relation to form the complete filter stack which is arranged to be supported within the filtering chamber by novel supporting means which will subsequently be described in detail.

Referring to Figs. 2, 4, and 5, each unit 22 is composed of a pair of sections each including a spider 23 stamped or otherwise formed from an appropriate sheet metal or other suitable material. The spiders 23 are annular and each is provided with an inner or hub portion having a marginal flange 24 and a peripheral portion including a flange 25, these flanges extending axially in opposite directions. The inner flange 24 defines a central opening 26.

In their intermediate portions (in the general form of annular discs) between the flanges 24 and 25, the spiders 23 are provided with openings 27 that are separated by radially extending spokes 28 which are provided in alternate openings 27 with integrally formed right angled lugs 29, these lugs projecting in the same direction as the outer edge flange 25.

As shown in Fig. 4, a pair of the spiders 23 is assembled in relatively reversed superposed relation with their outer flanges 25—25 in edge to edge engagement, and the lugs 29 extending between the plate members and serving to hold them in spaced relation. By slightly staggering the arms 28 of one plate member with respect to the arms of the other plate member, as shown in Fig. 3, the adjacently disposed lugs 29 overlap each other and maintain the spiders in properly spaced relation.

Filtering elements in the form of flat rings 30 of filtering material engage the outer surfaces of the spiders 23, the inner edge of each ring being disposed next to the flange 24 of the associated spider, and the outer edge of the ring being adjacent the spider periphery. As thus positioned, the filtering material extends over the openings 27 of each spider. The spiders 23 and associated rings 30 of each filtering unit 22 are secured in assembled relation by means of a binding ring 31 which, in cross section, is in the form of an inwardly facing channel, having side walls 32—32 which embrace the peripheral margins of the spiders 23 and are clamped against the peripheral margins of the filtering elements 30—30 so as to anchor them securely to the spiders 23. The inner edges of the filtering elements 30 are secured by connector rings 33 slipped over the flanges 24 of the plate-like members and interconnecting the filtering units 22 in stacked assembly, as will hereinafter be described more fully.

It will be observed, by reference to Figs. 4 and 5, that the inner portions of the spiders 23 are slightly coned outwardly from a point indicated by the numeral 34 in the direction of the associated flange 24. As shown in Fig. 4, the angle of inclination is indicated by the numeral 35, and results in a gradual increase in the space between the spiders 23 of a filtering unit 22, in the unassembled, unstressed condition thereof. The areas adjacent the flanges 24 in the assembled spiders will therefore resiliently resist pressures which are axially applied by assembly connector rings 33—33 in order to bring the coned areas of the spiders into the same plane as the outer areas thereof.

A complete filter assembly is produced by stacking a plurality of the units 22 in superposed relation as shown in Fig. 1. Thus, the units 22 are in end-to-end relation, with the flanges 24 of adjacent units in confronting relation. Connector rings 33 align the units 22 and retain them against lateral relative displacement.

The aligned flanges 24 and connector rings 33 cooperate to form a common flow passage 36 extending axially through the filter stack, this passage laterally communicating with the hollow interior of each unit 22 and filtering openings 27 therein. Due to the previously mentioned resilient action of the coned inner portions of the spiders 23, it will be appreciated that the complete filter stack will be axially compressible and expansible, providing for a "breathing" action which accommodates expansion and contraction of the assembly in response to temperature changes, while constantly maintaining a tight, sealed fit between adjacent filtering units 22 and the intervening connector rings 33.

One manner in which the filter stack of the present invention may be supported in the filter device is shown in Fig. 1. In this arrangement, the filter stack is positioned with a terminal flange 24 piloted within the tubular seat portion 15 which acts to center this end of the filter element with respect to the stem 16. The opposite end of the filter stack is positioned in concentric relation to the stem 16 by means of a dished washer 37 having a peripheral flange 38 surrounding the projecting flange 24 of the terminal unit 22 at this end of the filter. A compression spring 39 is positioned around the stem 16 between the filter element and the bottom of the bowl 11, one end of this spring acting against a washer 40 bearing against the seal 20, and the other end of the spring acting against a washer 41 bearing against a sealing ring 42 which is compressible between the washer 41 and dished washer 37 into sealing engagement with the surface of the stem 16.

It will be seen that the spring 39 acts to apply axial pressure between the ends of the filter stack, and moreover, maintains the units 22 in connected relation against lateral displacement, and through the action of washer 37 and tubular seat portion 15, the filter element is located with respect to the stem 16 so that a uniform annular flow passage will be maintained.

A snap ring 43 associated with the stem 16 forms a stop which limits downward movement of the washer 41 under the expansible action of the filter stack, when the spring 39 is removed, for example, when detaching the bowl 11 from the main body portion in order to gain access to the filter stack.

In some types of filter constructions, the filter chamber is too shallow to permit the use of a spring such as spring 39 and associated parts for retaining the filter element in mounted position. In order to illustrate the adaptability of the filter element of the present invention for such devices, there is shown in Fig. 6, a filter device having a relatively shallow filtering chamber 12' with a central stem member 16'.

In this device, the filtering chamber is constructed with a circumferentially extending inclined shoulder 44 which forms a seat for the peripheral portion of a dished ring-like partition member 45 provided with an inner flange 46 adapted to receive therein the outermost flange 24 of the endmost unit 22 of the filter stack, this flange 46 acting in a manner similar to the previously described tubular seat portion 15 to locate the filter element with respect to the stem 16'. At the other end of the filter element, there is provided a washer 46 on the stem 16', this washer having a peripheral flange 47 adapted to receive therein the outermost flange 24 of the unit 22 at this end of the filter stack. The washer 46 acts in a manner similar to the dished washer 37 previously described.

As previously explained, a filter stack fabricated from a plurality of units 22 constructed according to the present invention, is axially compressible and expansible. Thus, if the filter stack is mounted as shown in Fig. 6 and compressive forces applied against the washer 46, this force will be resiliently resisted by virtue of the inherent construction of the units 22, as previously described. It is therefore possible to axially compress the filter stack by applying pressure against the washer 46. When thus compressed, the filter stack may be retained against expansion by means of snap ring 43' associated with this end of the stem 16'. In this type of mounting, the axial forces in the compressed filter stack act to maintain the units 22 in connected relation, and through the partition member 45 and washer 46 to locate the filter stack in properly centered relation to the stem 16'.

We claim:

1. In a filter: a plurality of filtering units each comprising a pair of annular spiders of resilient material each including an annular hub portion having a flange projecting axially in one direction; an annular peripheral portion including a flange projecting axially in the opposite direction, and an intermediate annular disc portion joining said inner and peripheral portions and having aperatures therein, annular spiders of each unit being arranged with their respective peripheral flanges facing toward and abutting each other and their respective hub flanges facing away from each other; a plurality of substantially rigid connector rings in which the hub flanges of the nearest spiders of adjacent units are respectively piloted to provide a filtering stack in which said units are stacked on a common axis; a plurality of annular filtering elements supported on the respective spiders and covering said apertures; casing means enclosing said filter stack and comprising a plurality of sections; and means carried by said casing sections and engaging opposite ends of said stack under pressure to maintain said stack in assembly with said hub flanges pressed into said connector rings, and with the inner portions of the opposed spiders of each unit flexed axially toward each other so as to yieldingly allow expansion and contraction in said units, and with said hub portions maintained in spaced relation by the engagement of said peripheral flanges and the flexure stresses in said spiders.

2. In a filter: a plurality of filtering units each comprising a pair of annular spiders of resilient material each including an annular hub portion having a flange projecting axially away from the center of the unit, an annular peripheral portion abutted against a like peripheral portion of the opposed spider and an intermediate annular disc portion joining said hub and peripheral portions and having apertures therein, annular spiders of each unit being arranged with their respective peripheral flanges facing toward and abutting each other and their respective hub flanges facing away from each other; a plurality of connector rings in which the hub flanges of the nearest spiders of adjacent units are respectively piloted to provide a filter stack in which said units are stacked on a common axis and interlocked against relative radial displacement; a plurality of annular filtering elements supported on the respective spiders and covering said aperture; and means engaging opposite ends of said stack under compression to maintain successive spiders in snug interengagement of said hub flange and connector rings and of said peripheral portions, with the intermediate annular disc portions of each unit flexed axially toward each other in the inner portions thereof so as to maintain compression in said stack while yieldingly allowing expansion and contraction in said units, and with said hub portions maintained in spaced relation by the engagement of said peripheral flanges and the flexure stresses in said spiders.

3. A filter as defined in claim 2, wherein the inner margins of said filtering elements are clamped between said connector rings and said spiders.

4. A filter as defined in claim 3, including, for each of said units, a binding ring of channel section, receiving the peripheral portions of the spiders and filtering elements of said unit and clamping said filtering elements against said peripheral spider portions.

5. A filter as defined in claim 2, wherein said means for engaging the ends of the stack includes resilient, yielding pressure applying means adapted to accommodate said axial expansion and contraction by changes in the overall axial dimension of the stack.

6. A filter as defined in claim 2, wherein said compression applying means comprises a stem extending axially through said stack and spaced from the inned margins of said spider hub portions by an annular flow passage, and means anchored to respective ends of said stem, for transmitting pressure to the ends of said stack.

7. In a filter: a plurality of filtering units each comprising a pair of annular spiders of resilient material including respective annular hub portions having respective flanges facing axially away from the center of the unit, annular peripheral portions including respective flanges facing toward and abutted against each other, and an intermediate annular disc portion joining said hub and peripheral portions and having apertures therein; a plurality of connector rings in each of which the hub flanges of the nearest spiders of adjacent units are respectively piloted, said connector rings being interposed between adjacent filtering units to provide a filter stack in which said units are stacked on a common axis and interlocked against relative radial displacement; a plurality of annular filtering elements supported on the respective spiders and traversing said apertures; said intermediate annular disc portions, adjacent said hub portions, in their unstressed state, being frusto-conical, with said hub portions spaced farther apart than said peripheral spider portions, but in assembly being flexed toward each other in each unit so as to be substantially co-planar with said peripheral portions; and means engaging the ends of said stack and exerting axial compression thereon to maintain said inner spider portions in said flexed state, whereby to maintain tight interengagement between said inner flanges and connecting rings and between said peripheral flanges while yieldingly allowing axial expansion and contraction of said units, the inner margins of said filtering elements being clamped between said connector rings and hub portions and being maintained in spaced relation by the engagement of said peripheral flanges and the flexure stresses in said spiders, and peripheral binding means clamping the peripheral portions of said filtering elements to said peripheral spider portions, and the latter to each other.

8. In a filter, a plurality of filtering units each comprising a pair of spiders including peripheral portions having respective flanges facing toward and abutting each other, inner portions of frustoconical form spreading apart toward the center of the unit when unstressed and having at their inner margins, hub flanges projecting axially away from each other and abutted against corresponding flanges of adjacent units, and intermediate annular disc portions provided with apertures; a plurality of annular filtering elements supported on respective spiders and covering said apertures, said filtering elements having inner marginal portions closely encircling said flanges and defining central openings through which said hub flanges project; connector rings in which said hub flanges of the nearest spiders of adjacent units are piloted, said connector rings being interposed in alternating array between said filtering units, maintaining them in stacked assembly on a common axis, and clamping the inner margins of said filtering elements in sealing engagement with said inner spider portions; a peripheral binding ring for each of said units, of channel section, embracing said abutting peripheral spider portions and also the peripheral portions of the filtering elements and clamping the latter in sealing contact with said peripheral spider portions; and means engaging the ends of said assembly under compression and deflecting said inner spider portions of each unit toward each other so as to maintain the sealing connections between said connector rings and filtering elements while allowing axial expansion and contraction of said units.

OTIS A. WRIGHT.
EDWARD H. GODDARD.
RUSSELL H. COLE.

REFERENCES CITED

The following references are of record in the file of this patent:

UNITED STATES PATENTS

| Number | Name | Date |
|---|---|---|
| 2,084,753 | Watson et al. | June 22, 1937 |
| 2,088,199 | Gleason | July 27, 1937 |
| 2,392,354 | Alsop | Jan. 8, 1946 |
| 2,462,488 | Gunn | Feb. 22, 1949 |

FOREIGN PATENTS

| Number | Country | Date |
|---|---|---|
| 390,889 | Great Britain | 1932 |